June 4, 1957 T. W. RAMSAY 2,794,218
WINDOW MOUNTINGS FOR MOTOR VEHICLES
Filed Oct. 28, 1955 2 Sheets-Sheet 2
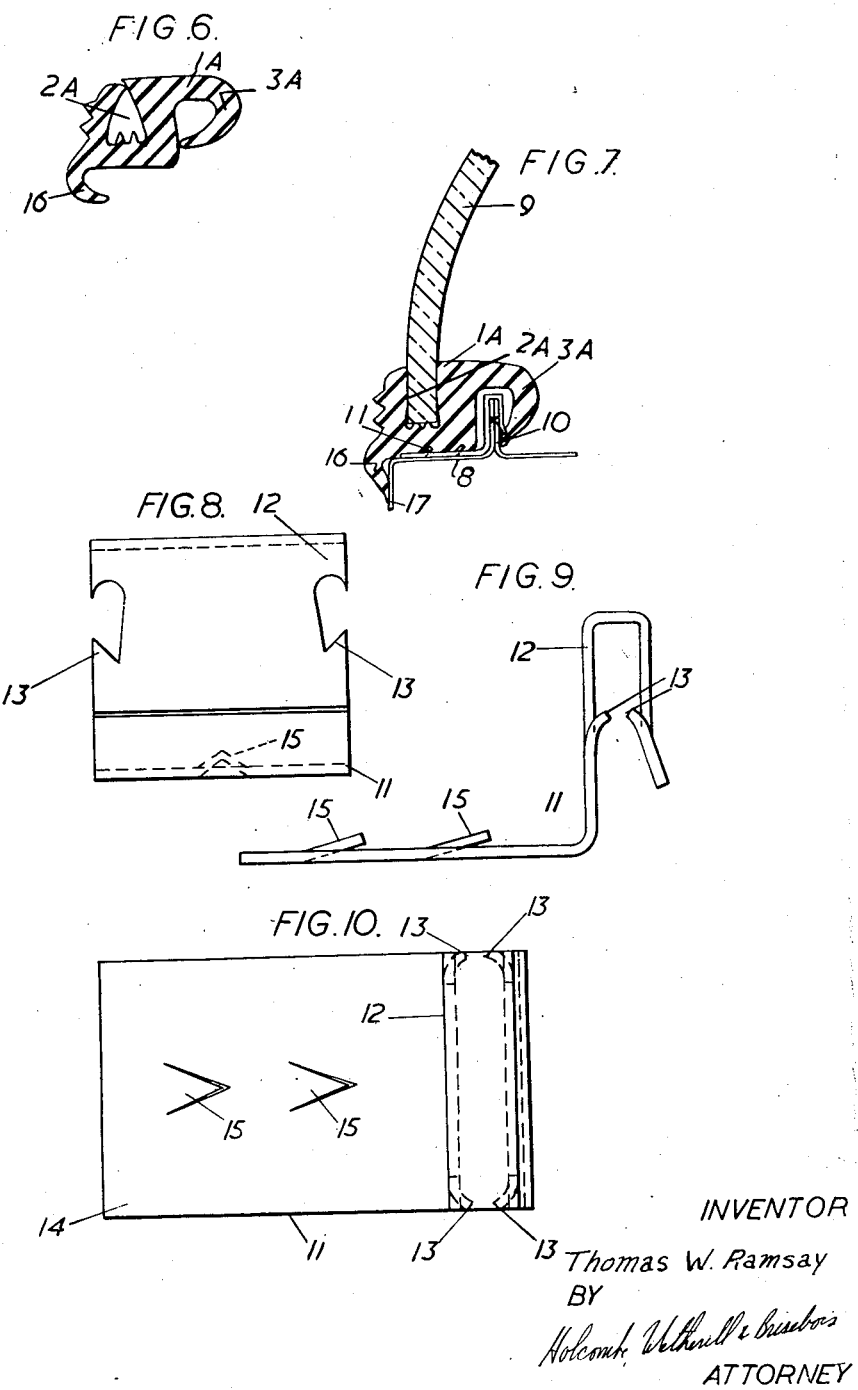

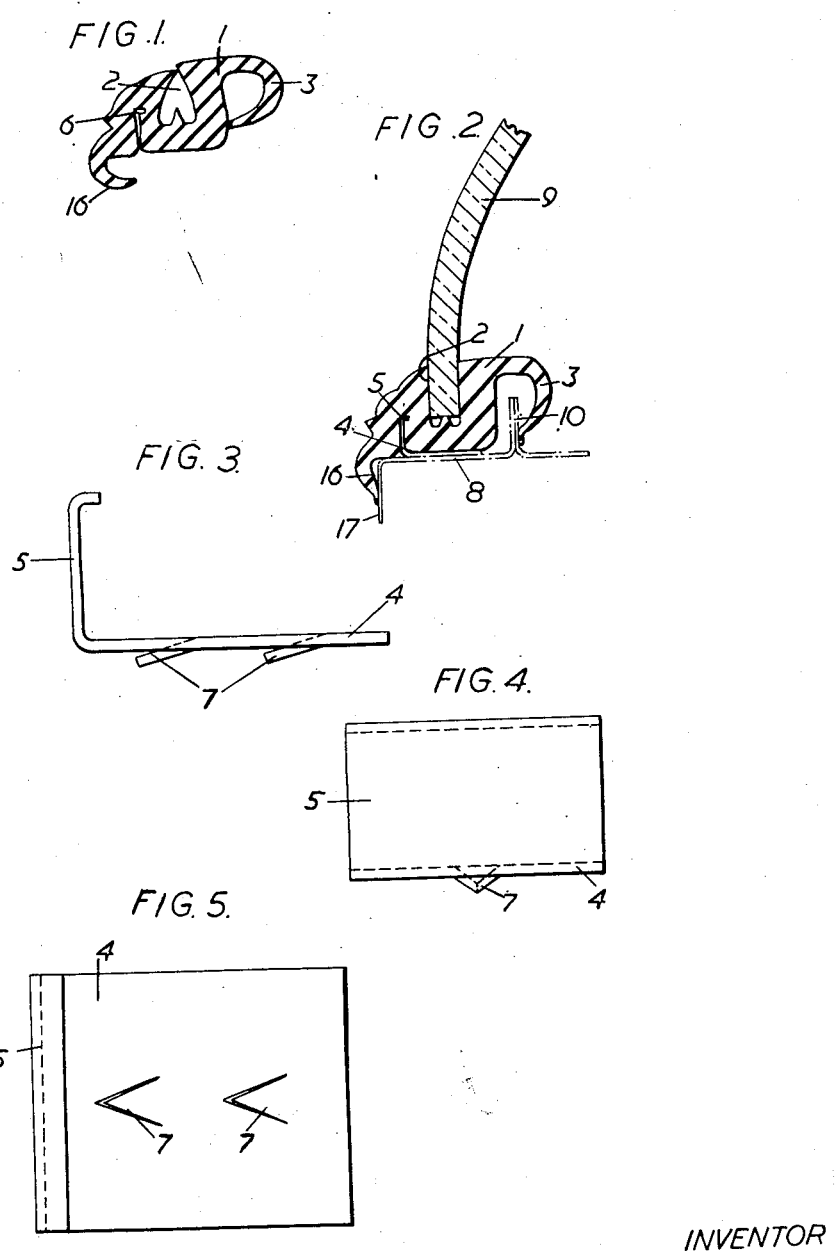

United States Patent Office 2,794,218
Patented June 4, 1957

2,794,218

WINDOW MOUNTINGS FOR MOTOR VEHICLES

Thomas W. Ramsay, Headington, England, assignor to Morris Motors Limited, Cowley, England Application October 28, 1955, Serial No. 543,486

3 Claims. (Cl. 20—56.4)

This invention relates to window mountings for motor vehicles and, in particular, is concerned with curved windscreens and backlights.

One of the modern developments in the styling of motor car bodies is the provision of highly-curved windscreens and backlights, commonly designated the wrap-round type, the aim being to afford improved visibility from the driving seat by reducing the so-called blind spots created by the windscreen pillars and, in the case of a saloon body, also by the rear quarter panelling when an interior driving mirror is used.

At present the manufacture of toughened safety glass panels for windscreens and backlights of the wrap-round type is beset with the practical difficulty of complying with the tolerances specified by the vehicle manufacturer as regards the chordal dimension, namely the distance between the wrap-round edges of the panel. In some instances it is possible to accommodate this difficulty by adopting rather complicated and costly methods of mounting the glass panels in place, but resort to such methods is hardly feasible in the case of vehicles manufactured on a flow-production basis.

The glass panel of the windscreen or the backlight of a motor vehicle having a pressed steel body is almost invariably mounted in a channelled rubber glazing strip which is designed to be held in place by a retaining flange extending completely around the windscreen aperture.

The present invention is based upon the notion of incorporating, in the rubber glazing strip, provision for accommodating such deviations from standard as are likely to arise in the above-mentioned chordal dimension of the wrap-round glass panels.

According to this invention the glass panel of a wrap-round type of windscreen or backlight for a motor vehicle is mounted in a rubber glazing strip which is channelled to grip the panel tightly, and which is held firmly in place on the surround of the window aperture by means of spring clips provided with barb-like retaining tags. That is to say, the arrangement is such that the panel assembly is simply pushed into place and automatically held when the retaining tags become effective. The glazing strip has an integrally-formed curved flap for concealing the usual flange around the window aperture.

Referring to the accompanying drawings:

Figure 1 is a cross-section of a rubber glazing strip in accordance with the invention, after it has been cured;

Figure 2 is a fragmentary cross-sectional plan view showing the glazing strip of Figure 1 fitted to a window aperture of a motor vehicle;

Figures 3 to 5 show, in side elevation, end elevation and plan respectively, a retaining clip used in the assembly illustrated in Figure 2;

Figure 6 is a view similar to Figure 1, showing a modified form of rubber glazing strip; after curing;

Figure 7 is a fragmentary cross-sectional plan view showing the glazing strip of Figure 6 fitted to a window aperture of a motor vehicle; and Figures 8 to 10 show, in side elevation, end elevation and plan respectively, a retaining clip used in the assembly illustrated in Figure 7.

The rubber glazing strip 1 (Fig. 1), which may conveniently be produced by extrusion, is formed with a channel 2, designed to grip the glass panel tightly, and with a curved flap 3 which, after curing, has its edge in contact with the main part of the strip. The latter is fitted throughout its length with L-shaped spring steel clips 4 (Figs. 3 to 5) spaced two or three inches apart, the shorter limb 5 of these clips being received in a slit 6 (Fig. 1) formed in the base of the strip 1. The longer limb of the clips 4, which lies across the base of the glazing strip, is formed with a pair of barb-like retaining tags 7. These project from the exposed face of the clips and point away from the direction in which the panel assembly is pushed on to the surround of the window aperture. Consequently, when the panel assembly has been put into place, the retaining tags 7 dig into the adjoining body panelling of the vehicle because the curved glass panel tends to spring back, and the assembly is thus held firmly in place.

Figure 2 illustrates part of a motor vehicle windscreen pillar 8 fitted with the glazing strip 1, a wrap-round type of windscreen 9 being held in the channel 2. The curved flap 3 is sprung over the usual flange 10 around the window aperture, and serves to conceal this flange.

The modified form of rubber glazing strip 1A, shown in Figure 6, has a channel 2A for the glass panel, and a curved flap 3A, and mainly differs from the strip 1 in having no slit corresponding to the slit 6 (Fig. 1) in its base. In this case L-shaped spring steel clips 11, of the pattern shown in Figures 8 to 10, are employed. The shorter limb 12 of these clips is formed as a channel (Fig. 9) which has two pairs of inwardly directed bars 13 arranged to grip the flange 10 (Fig. 7) around the window aperture when the channel has been pushed on to the flange. The longer limb 14 of the clips 11 has a pair of barb-like tags 15 pointing in the direction in which the panel assembly is offered to the surround of the window aperture.

The clips 11 are fitted to the flange 10 at intervals of two or three inches, and the panel assembly constituted by the glazing strip 1A and the windscreen 9 is pushed into place. The base of the glazing strip 1A rides over the inclined tags 15 until the panel assembly has been pushed right home. The retaining tags 15 then dig into the rubber strip and hold the assembly firmly in place.

The glazing strips 1 and 1A are each formed with a curved lip 16 to afford a seal with the adjoining part 17 of the body panelling of the vehicle, and sealing compound is applied under the lip to render the joint water-tight.

I claim:

1. Means for mounting a curved glass panel of the wrap-around type in an automobile, comprising in combination an elongated rubber glazing strip provided with a first longitudinal channel adapted to receive said panel and a second longitudinal channel parallel to the first but opening on the opposite side of said strip, a framing strip carrying a flange which projects inwardly toward the center of said window and is seated in said second channel, the base of said second channel being substantially broader than said flange so as to permit variation in the lateral position of said flange with respect to said channel base, from point to point therealong, said window and framing strips being fastened together by means of a resilient metallic clip, one edge of which is fixed to one of said strips and the other edge of which carries a plurality of longitudinally spaced barbs adapted to dig into any point on the other strip and thus maintain a connection between said strips regardless of differences in the distance between corresponding points thereon.

2. Means according to claim 1 in which the clips are of L-shaped cross-section and one end thereof is embedded in the glazing strip.

3. Means according to claim 1 in which the clips are of L-shaped cross-section and the barbless limb is formed as a channel which is fixed on the inwardly extending flange on the framing strip so that the glazing strip and panel may be pushed into place thereagainst, thereby engaging the barbs and the glazing strip.

References Cited in the file of this patent
UNITED STATES PATENTS

| | | |
|---|---|---|
| 1,876,026 | Schinkal | Sept. 6, 1932 |
| 1,884,135 | Nett et al. | Oct. 25, 1932 |
| 2,610,713 | Bradley | Sept. 16, 1952 |